(12) United States Patent
Sandiford

(10) Patent No.: US 8,496,021 B2
(45) Date of Patent: Jul. 30, 2013

(54) OVERPRESSURE VALVE FOR AN AIRCRAFT

(75) Inventor: J. Patrick Sandiford, Bristol (GB)

(73) Assignee: Airbus Operations Limited, Bristol (GB)

( * ) Notice: Subject to any disclaimer, the term of this patent is extended or adjusted under 35 U.S.C. 154(b) by 735 days.

(21) Appl. No.: 11/855,399

(22) Filed: Sep. 14, 2007

(65) Prior Publication Data

US 2008/0078457 A1    Apr. 3, 2008

(30) Foreign Application Priority Data

Oct. 2, 2006 (GB) .................................. 0619443.5

(51) Int. Cl.
*F16K 17/16* (2006.01)
*F16K 17/40* (2006.01)
*B64C 3/34* (2006.01)

(52) U.S. Cl.
USPC ............. 137/68.24; 137/71; 137/599.16; 244/135 R

(58) Field of Classification Search
USPC ............ 137/70, 71, 493, 511, 601.2, 68.24, 137/599.16; 244/135 R
See application file for complete search history.

(56) References Cited

U.S. PATENT DOCUMENTS

| | | | | |
|---|---|---|---|---|
| 1,571,022 A * | 1/1926 | Obert | ................ | 137/71 |
| 2,236,564 A * | 4/1941 | Cornell, Jr | ................ | 137/71 |
| 2,509,978 A * | 5/1950 | Kazimierz Ksieski | ... | 244/135 R |
| 2,599,979 A * | 6/1952 | Drane | ................ | 137/493 |
| 2,835,266 A * | 5/1958 | Morte | ................ | 137/115.23 |
| 3,587,618 A * | 6/1971 | Kenyon | ................ | 137/87.06 |
| 3,797,511 A * | 3/1974 | Selby | ................ | 137/71 |
| 3,874,404 A * | 4/1975 | Waight et al. | ................ | 137/493 |
| 3,946,755 A * | 3/1976 | Ulanovsky | ................ | 137/493 |
| 4,679,586 A * | 7/1987 | Riedel et al. | ................ | 137/491 |
| 4,687,421 A * | 8/1987 | Cameron et al. | ................ | 417/296 |
| 4,795,051 A * | 1/1989 | Ou | ................ | 220/89.2 |
| 5,099,869 A | 3/1992 | Derouet et al. | | |
| 6,230,733 B1 * | 5/2001 | Strelow et al. | ................ | 137/68.23 |
| 2004/0262455 A1 * | 12/2004 | Picot et al. | ................ | 244/135 R |
| 2005/0241700 A1 * | 11/2005 | Cozens et al. | ................ | 137/587 |

FOREIGN PATENT DOCUMENTS

| | | |
|---|---|---|
| GB | 2028426 A | 3/1980 |
| WO | 2004081433 A2 | 9/2004 |

OTHER PUBLICATIONS

GB Search Report mailed Dec. 13, 2006 for GB 0619443.5.

* cited by examiner

*Primary Examiner* — Craig Schneider
*Assistant Examiner* — Atif Chaudry
(74) *Attorney, Agent, or Firm* — Lowe Hauptman Ham & Berner, LLP

(57) ABSTRACT

An aircraft includes an overpressure valve with a sealing member which is moveable, in response to a first pressure differential across the valve, between a closed position and an open position. The overpressure valve further has a frangible portion, for example, a carbon or sheet metal disc. The frangible portion is arranged to fail in response to a second pressure differential across the valve, the second pressure differential being more than the first pressure differential. Thus the valve is still able to relieve pressure when the sealing member is jammed (due to ice, for example). The valve may be in the surge tank of a fuel tank system.

17 Claims, 5 Drawing Sheets

OVERPRESSURE VALVE FOR AN AIRCRAFT

RELATED APPLICATIONS

The present application is based on, and claims priority from, British Application Number 0619443.5, filed Oct. 2, 2006, the disclosure of which is hereby incorporated by reference herein in its entirety.

TECHNICAL FIELD

The present invention relates to an overpressure protector and more particularly to an overpressure protector for use in an aircraft and an aircraft comprising an overpressure protector.

BACKGROUND OF THE INVENTION

In certain parts of an aircraft, for example in the aircraft fuel tank system or in the bleed-air inerting system, it is desirable to have an overpressure protector to relieve excess pressure should it reach a dangerous level.

In a fuel tank system, dangerous pressure differentials may occur when, for example: the aircraft is being refuelled (resulting in high pressure in the tank relative to the atmosphere i.e. positive pressure differential); the aircraft is making an emergency descent (resulting in low pressure in the tank relative to the atmosphere i.e. negative pressure differential); or the fuel venting system between individual tanks becomes blocked (resulting in a large pressure differential across the fuel tanks).

It is known to fit an overpressure protector in the form of an overpressure valve. The overpressure valve is typically in the form of a poppet valve or the like and is adapted to move from a closed position to an open position in the event of an excessive pressure differential. The valve can be reset, typically manually, and does not therefore require replacement after use. The valve tends to be easy to maintain. The valve can also be mounted flush with the outer skin of the aircraft (when used in the surge tank) thereby providing a low-drag arrangement.

It will be appreciated that the above-described overpressure valve thus has a number of advantages. However, a significant problem with the valve is that it can become jammed closed. Since the overpressure valve itself tends to be a back-up pressure release means, if it jams, excess pressure may be allowed to build up and there is a risk of the aircraft structural integrity failing. In, for example, an aircraft fuel system, the overpressure valve may jam due to ice formation in the valve. In such circumstances the primary venting means (for example a flame arrestor/NACA duct) may have also become blocked with ice and there is an especially high risk of excess pressure build-up.

Another known type of overpressure protector is a frangible disc. The frangible disc may be arranged to fail (rupture) when the pressure differential exceeds a certain level. The frangible disc tends to be a simple and light design and is less susceptible to the effects of icing. However, frangible discs cannot be reset and must be entirely replaced after use. This is costly and time consuming. In addition, in an aircraft fuel tank system, the disc tends to be recessed from the wing skin in a tubular housing within the surge tank. This limits spurious failures of the disk but can cause significant drag.

SUMMARY OF THE INVENTION

The present invention seeks to mitigate or remove at least some of the above-mentioned disadvantages, and/or to provide an improved overpressure protector.

The present invention provides an aircraft comprising an overpressure valve, the overpressure valve comprising a sealing member which is moveable, in response to a first pressure differential across the valve, between a closed position for preventing free communication of fluid through the overpressure valve, and an open position for allowing free communication of fluid through the overpressure valve, wherein the overpressure valve further comprises a frangible portion and the frangible portion is arranged to fail in response to a second pressure differential across the valve, the second pressure differential being more than the first pressure differential, and wherein failure of the frangible portion allows free communication of fluid through the overpressure valve.

The overpressure valve of the present invention may therefore enable a back-up means of pressure relief (by way of the frangible portion) in the event that the sealing member is jammed in the closed position. The sealing member may become jammed in the closed position in the event of, for example, ice build-up or the presence of a foreign object. Thus, the overpressure valve of the present invention may provide a number of the benefits afforded by a known overpressure valve, but may also offer improved safety.

The frangible portion is preferably arranged to catastrophically fail in response to the second pressure differential. For example, the frangible portion is preferably arranged to rupture, tear or shatter. The frangible portion may be sheet metal. The frangible portion may be carbon fibre.

The frangible portion may be located anywhere on the valve on which the second pressure differential acts. The frangible portion may be located on the valve body. The frangible portion may be located in a by-pass tube.

The sealing member may comprise the frangible portion. For example, the frangible portion may comprise a web of frangible material in the sealing member. The frangible portion may be integral to the structure of the valve, and more preferably to the structure of the sealing member.

The overpressure valve is preferably arranged such that the frangible portion is located in a region that is not susceptible, during use, to ice formation. If ice forms on the frangible portion, it may hinder, or even prevent, the frangible portion failing at the second pressure differential. The frangible portion may be located above the lowest portion of the valve where water/ice is less likely to collect. It will be appreciated that the 'lowest portion' of the valve is the lowest portion of the valve during conventional use of the aircraft, for example during level cruise, or when stationary on the runway. The frangible portion is preferably located above the lowest portion of the sealing member. For example, in the embodiment in which the sealing member comprises the frangible portion, the sealing member may be dome-shaped, or conical and the frangible portion may be located on the upper region of the sealing member where water/ice is unlikely to collect.

The second pressure differential (in response to which the frangible portion is arranged to fail) is preferably in the same direction as the first pressure differential (in response to which the sealing member is moveable between the closed and open positions). For example if the sealing member is moveable between a closed position and an open position in response to a positive first pressure differential, the frangible portion is preferably arranged to fail in response to a (greater) positive second pressure differential. The sealing member is preferably moveable between the closed position and an open position, in response to both positive and negative pressure differentials across the valve.

The open position in response to a positive pressure differential may be different to the open position in response to a negative pressure differential. For example the sealing member may move outwards in response to a positive pressure differential and inwards in response to a negative pressure differential. Preferably however, the sealing member moves in the same direction from the closed to open positions in response to both positive and negative pressure differentials. The open position may be substantially identical in both cases.

The pressure differential at which the sealing member is arranged to move from the closed position to the open position may depend on the particular application of the overpressure valve in the aircraft.

The sealing member may be arranged to move from the closed position to the open position at a first pressure differential of +6 psi or more, more preferably of +8 psi or more, and yet more preferably of +10 psi or more. The sealing member may be arranged to move from the closed position to the open position at a first pressure differential of as high as +12 psi. As will be understood by the skilled man, 1 psi(lb per square inch) is approximately equal to 6.895 kN/m².

Alternatively, but preferably additionally, the sealing member may be arranged to move from the closed position to the open position at a first pressure differential of −3 psi or more, more preferably of −5 psi or more, and yet more preferably of −7 psi or more. For the avoidance of doubt, a pressure differential of more than an already negative value refers to a more negative value. Thus, an example of a pressure differential of more than −5 psi, is −6 psi.

The frangible portion may be arranged to fail at a second pressure differential of 0.5 psi, and more preferably 1 psi, more than the first pressure differential. The frangible portion may be arranged to fail at a second pressure differential of up to 2 psi more than the first pressure differential. The frangible portion may be arranged to fail at both positive and negative pressure differentials. The frangible portion may be arranged to fail at a second pressure differential of 9 psi or more, and more preferably 14 psi or more. The frangible portion may be arranged to fail at a second pressure differential of −6 psi or more, and more preferably −7 psi or more. The frangible portion may be arranged to withstand a greater magnitude of positive pressure differential than negative pressure differential.

The frangible portion may be scored. The frangible portion may be scored such that it fails at a predetermined pressure and/or in a particular fashion.

It will be appreciated that the present invention is of particular benefit in parts of the aircraft in which relatively high pressures may be experienced. For example, the overpressure valve may be located in the bleed-air inerting system (for de-oxidising air for use in the fuel tanks). The overpressure valve may be located in the aircraft de-icing system.

The overpressure valve may be located in the aircraft fuel tank system. The overpressure valve may therefore be arranged to protect against excess pressure in the fuel tank system. The overpressure valve may be located in the surge tank. The overpressure valve may be arranged between interior of surge tank and the exterior of the aircraft.

The fuel tank system comprises at least one fuel tank, and preferably comprises a plurality of fuel tanks. The overpressure valve may be located between separate fuel tanks within the fuel tank system. The fuel tank may be defined by sidewalls. The overpressure valve may be located in a side-wall of a fuel tank. The overpressure valve may be located in a rib defining a side wall, of a fuel tank. The side-wall may be a common boundary between two tanks. The overpressure valve may be located in piping connecting parts (such as fuel tanks) of the fuel tank system.

The present invention may be of greater application to larger aircraft. The aircraft is preferably heavier than 50 tonnes dry weight, and more preferably heavier than 200 tonnes dry weight. The aircraft is preferably of a size equivalent to an aircraft designed to carry more than 75 passengers, and more preferably more than 200 passengers.

According to another aspect of the invention, there is provided an aircraft wing comprising at least part of a fuel tank system and an overpressure valve located in part of the fuel tank system, the overpressure valve comprising a sealing member which is moveable, in response to a first pressure differential across the valve, between a closed position for preventing free communication of fluid through the overpressure valve, and an open position for allowing free communication of fluid through the overpressure valve, wherein the overpressure valve further comprises a frangible portion and the frangible portion is arranged to fail in response to a second pressure differential across the valve, the second pressure being more than the first pressure differential, and wherein failure of the frangible portion allows free communication of fluid through the overpressure valve.

According to yet another aspect of the present invention, there is provided an overpressure valve comprising a sealing member which is moveable, in response to a first pressure differential across the valve, between a closed position for preventing free communication of fluid through the overpressure valve, and an open position for allowing free communication of fluid through the overpressure valve, wherein the overpressure valve further comprises a frangible portion and the frangible portion is arranged to fail in response to a second pressure differential across the valve, the second pressure being more than the first pressure differential, and wherein failure of the frangible portion allows free communication of fluid through the overpressure valve.

It will be appreciated that features described in relation to the one aspect of the invention may equally be applied to other aspects of the invention. For example, the overpressure valve according to one aspect of the invention may incorporate any features described in relation to the overpressure valve on the aircraft of the first aspect of the invention.

DESCRIPTION OF THE DRAWINGS

Various embodiments of the invention will now be described, by way of example only, with reference to the accompanying schematic drawings of which.

DETAILED DESCRIPTION

Figure 1:
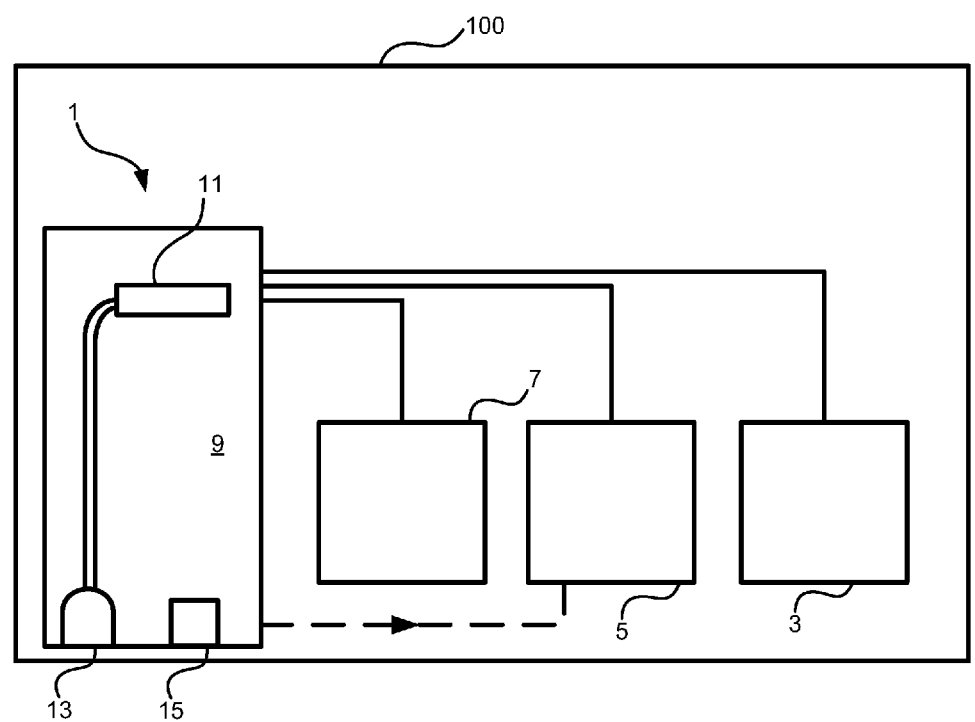
FIG. 1 is a schematic drawing of a fuel tank system in an aircraft according to a first embodiment of the invention.
Figure 5:
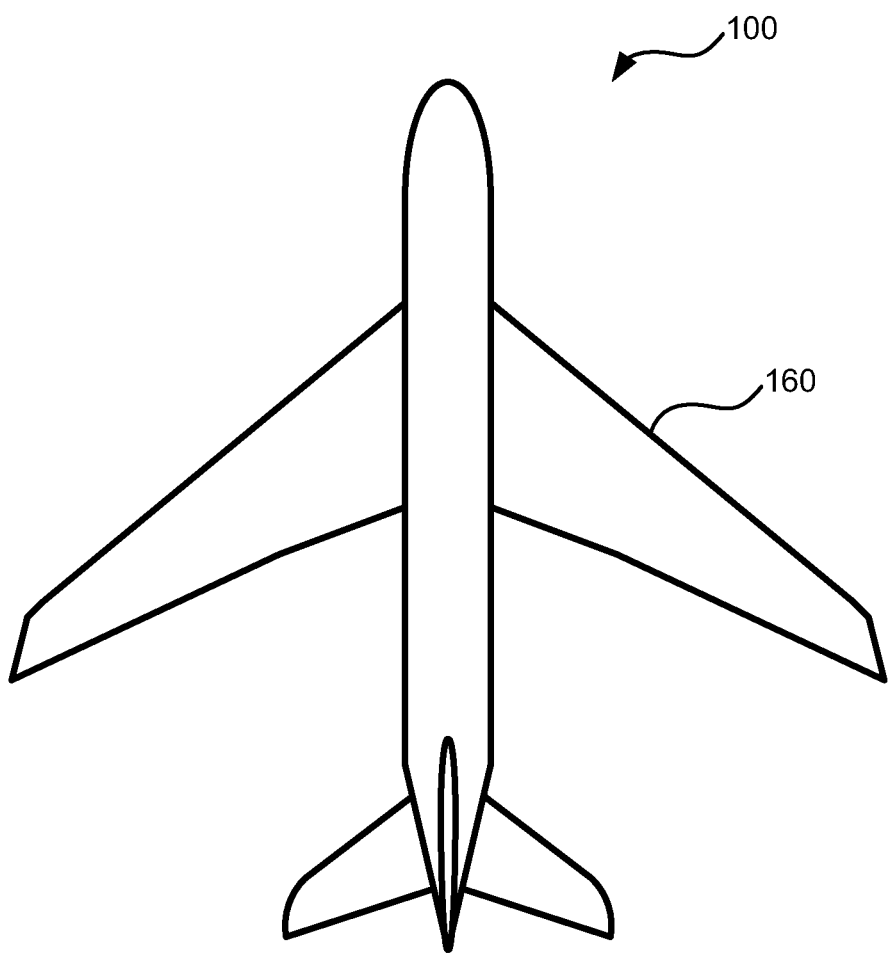
FIG. 5 is a top view of an aircraft in accordance with some embodiments of the invention.

FIG. 1 is a schematic drawing of a fuel tank system 1 in an aircraft 100 according to a first embodiment of the invention. FIG. 5 is a top view of an aircraft 100 in accordance with some embodiments of the invention. The aircraft 100 has at least a wing 160. The fuel tank system 1 comprises a centre tank 3, feed tank 5 and outer tank 7. These tanks are vented to the surge tank 9 at an outboard region of the wing 160.

The surge tank 9 enables the fuel system to vent to the atmosphere through a flame arrestor 11 connected to a NACA outlet 13. Such venting prevents excessive pressures building up in the tank system 1 and may be required, for example, when the aircraft is being refuelled (air leaving the tanks), if there is a re-fuel overflow (fuel leaving the centre tank and spilling overboard via the surge tank), when the aircraft is climbing (air leaving the tanks), or when the aircraft is descending (air entering the tanks).

An overpressure valve 15 is fitted on the underside of the surge tank. The overpressure valve 15 protects the fuel tank system from excessive tank pressures in the event that the primary venting route (flame arrestor/NACA duct) becomes blocked. The overpressure valve 15 is mounted flush with the lower wing skin 16 (see FIG. 2) so as to minimise drag.

The overpressure valve 15 is described in more detail with reference to FIGS. 2 and 3. The overpressure valve 15 comprises a valve body 17 and a sealing member 19 slideably mounted with respect to the valve body 17.

The sealing member 19 is connected via a shaft 21 to an actuating unit 23 located at the top of the valve body. The sealing member 19 is moveable between a closed position (shown in FIG. 2) and an open position.

In the closed position, the sealing member 19 abuts the valve seat 25 on the valve body 17 thereby preventing free communication of fluid through the overpressure valve. In the open position the sealing member 19 is lifted off the valve seat 25, thereby allowing free communication of fluid through the overpressure valve.

A spring in the actuating unit 23 effects movement of the sealing member between the closed and open positions in response to a positive pressure differential of more than +8 psi (i.e. greater pressure in the tank system than the surrounding atmosphere). The actuating unit 23 also effects movement of the sealing member between the closed and open positions in response to a negative pressure differential of more than −5 psi (i.e. less pressure in the tank system than the surrounding atmosphere). These pressure differentials may occur in the event that the flame arrestor becomes blocked and are around, but slightly less than, the maximum pressure differentials the fuel tank system structure can safely withstand.

In the first embodiment of the invention, the actuating unit 23 comprises a spring/latch and pressure chamber arrangement (not shown) such that the open position is the same in the event of both positive and negative pressure differentials across the valve.

When the sealing member is in the open position, fluid can pass through the valve and the potentially dangerous pressure differential is reduced. Once the pressure differential has dropped back to less than the operating pressure (i.e. less than +8 psi or −5 psi as the case may be) the actuating unit latches in the open position and the sealing member remains in the open position. Manual re-set of the valve is required to return it to the closed position.

Figure 3:
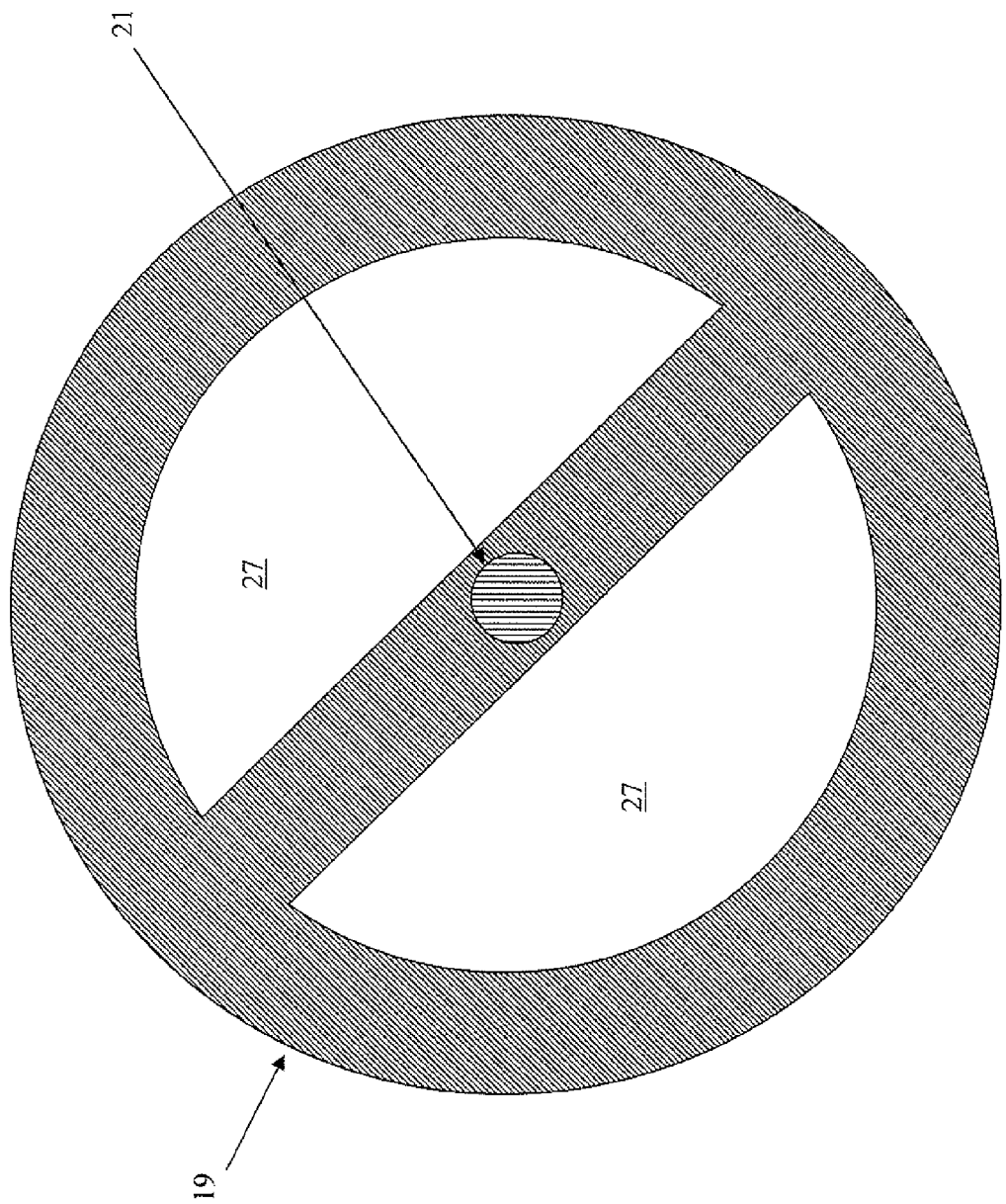
FIG. 3 is an end view of the overpressure valve in the aircraft according to the first embodiment of the invention.

The overpressure valve 15 further comprises a frangible portion 27 (see FIG. 3). The frangible portion comprises two semi-circular carbon fibre webs, integrally formed with the aluminium alloy sealing member 19.

The frangible portion 27 is arranged to catastrophically fail in response to pressure differentials across the valve of +9 psi and −6 psi (i.e. greater than the pressure differentials at which the sealing member 19 would tend to move from the closed to open positions). These pressures will not normally be experienced as the sealing member 19 will move to the open position to relieve them. However, if the sealing member 19 becomes jammed in the closed position (for example due to ice formation) such dangerous pressure differentials may occur.

At the higher pressure differentials (+9 psi and −6 psi), the frangible portion 27 valve will rupture thereby allowing free communication of fluid through the overpressure valve, and protecting the fuel tank system from excessive pressures. The overpressure valve therefore enables a back-up means of pressure relief (by way of the frangible portion) in the event that the primary means of pressure relief (the sealing member moveable between closed and open positions) is jammed in the closed position. The overpressure valve 15 is therefore relatively safe as it can release pressure even if the sealing member is jammed. In addition, the frangible portion is reliable and simple to maintain.

The frangible portion in the first embodiment of the invention can withstand a greater magnitude of positive pressure than negative pressure. This is achieved by the lay-up of the carbon fibres on the frangible web.

According to a second embodiment of the invention (not shown) the overpressure valve is located in the side of an aircraft rib. The rib forms a side-wall between two separate fuel tanks in the aircraft fuel tank system. The overpressure valve itself is of similar construction to the overpressure valve 15 of the first embodiment.

In the event that the piping from one tank becomes blocked and the fuel pressure in that tank becomes excessive the sealing member moves from the closed to the open position. This excessive pressure could be positive (e.g. during refuelling) or negative (e.g. during transfer).

To provide an additional level of safety, the sealing member comprises an aluminium frangible web. The web is scored such that it ruptures at a pressure differential of +7 psi (which is less than the maximum allowable tank pressure). Thus, if the sealing member becomes jammed (for example due to a foreign object), the frangible portion provides an additional pressure release means.

According to a third embodiment of the invention (not shown) the overpressure valve is substantially as described with reference to the first embodiment except the sealing member is conical. The upper portion of the conical sealing member comprises a frangible web in the form of a metal sheet. As the web is located above the lowest part of the sealing member and the valve, water tends not to collect there and the web tends not to be susceptible to ice formation. Thus if the sealing member becomes stuck in the closed position due to ice formation, the frangible portion tends to be largely unaffected and still fails at approximately 9 psi or −6 psi.

Figure 2:
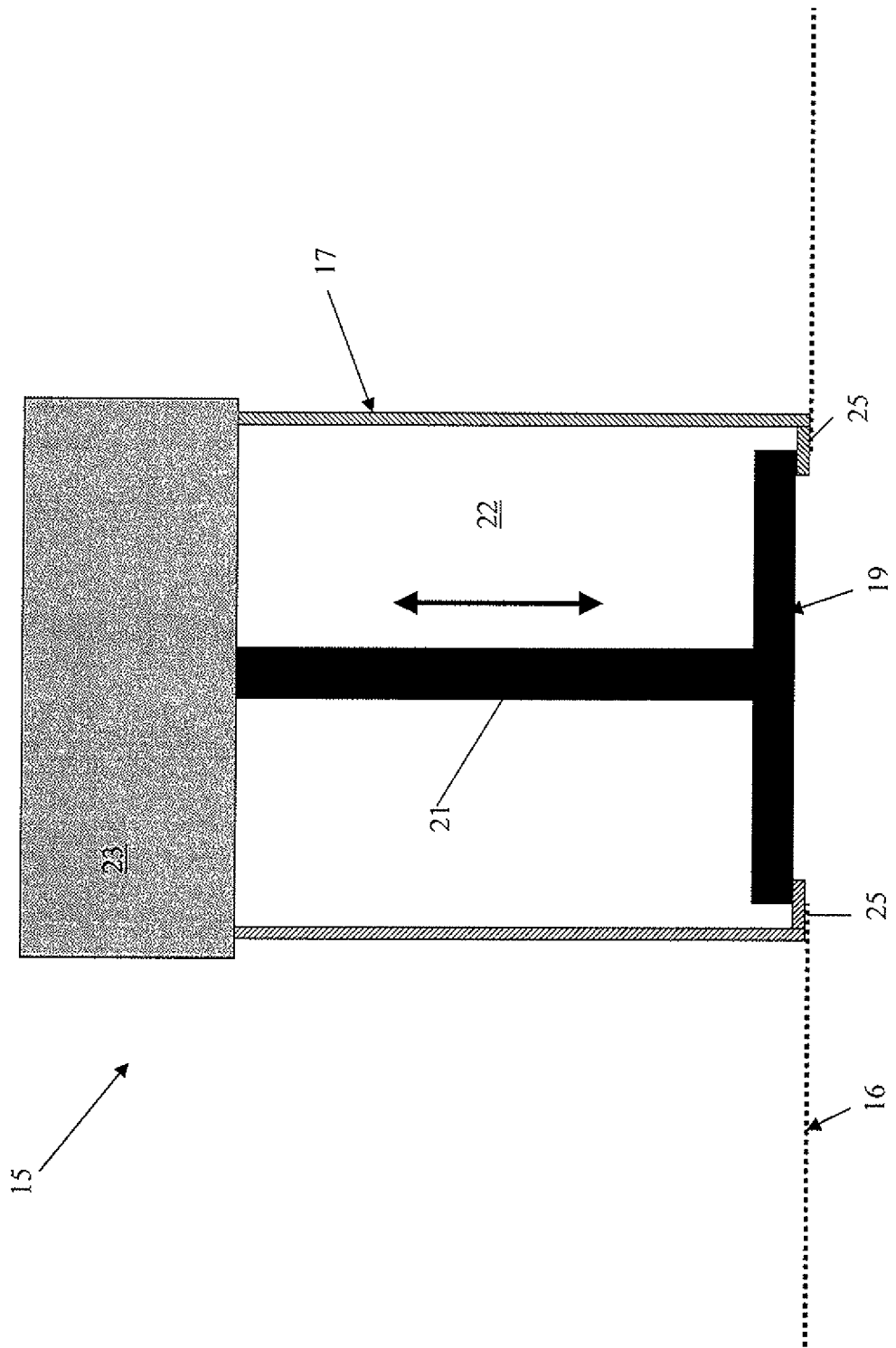
FIG. 2 is a side view of the overpressure valve in the aircraft according to the first embodiment of the invention.
Figure 4:
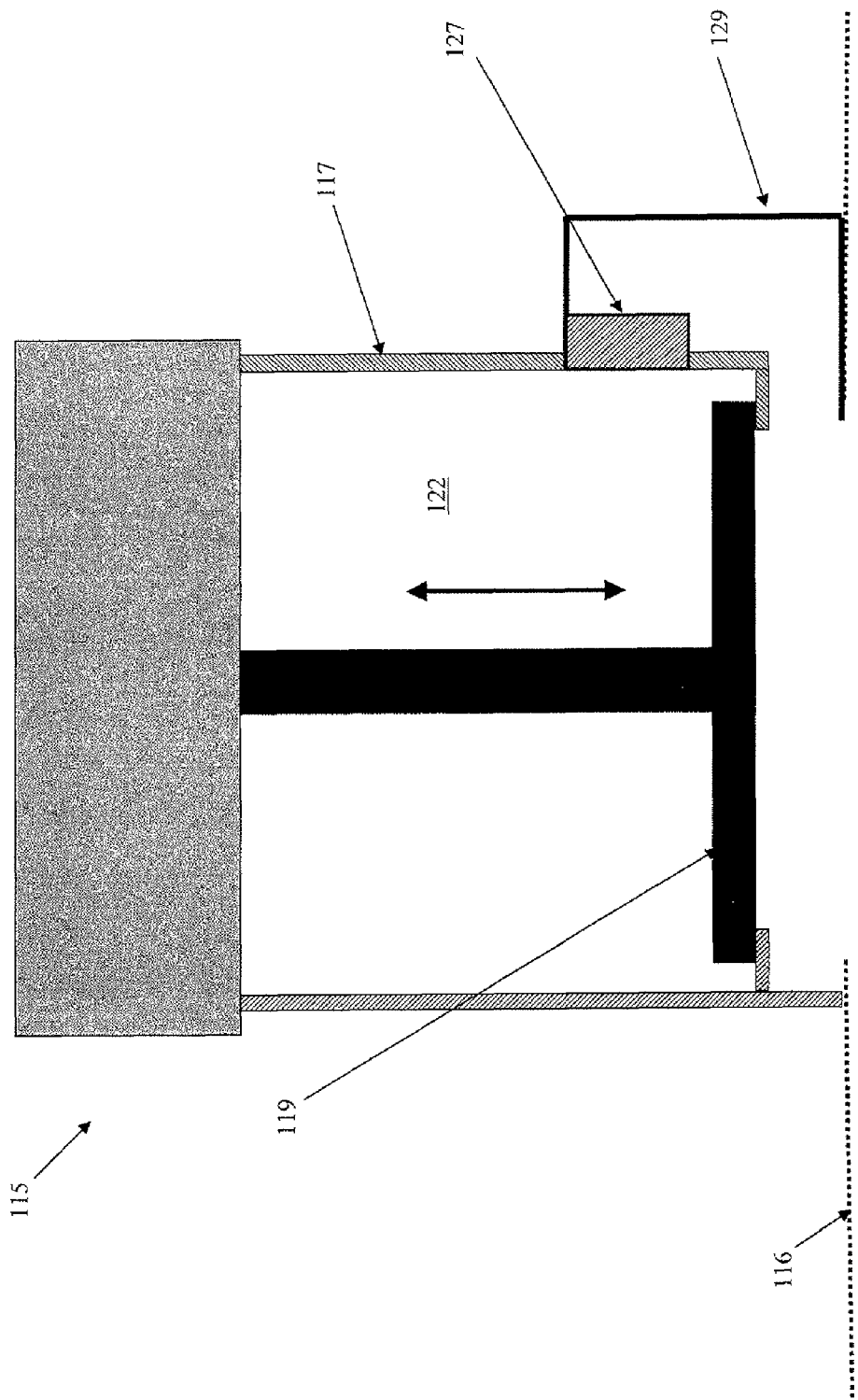
FIG. 4 is a side view of an overpressure valve according to a fourth embodiment of the invention.

In a fourth embodiment of the invention shown in FIG. 4, the overpressure valve 115 is similar to that on the aircraft of the first embodiment shown in FIG. 2, except that the sealing member 119 is in the form of a thick aluminium disc with no frangible portion. In addition, the valve body 117 comprises a by-pass tube 129 connecting the chamber 122 and the underside of the wing 116. The by-pass tube 129 contains a frangible ceramic disc 127 and is subject to the same pressure differential as occurs across the sealing member 119. The sealing member 119 moves to an open position in response to a pressure differential of −4 psi and the frangible disc fails at −5 psi. The sealing member 119 also moves to an open position in response to a pressure differential of +5 psi, and the frangible disc fails at +6 psi.

In the event that the pressure differential between the surge tank and the surrounding atmosphere is more than −5 psi/+6 psi, and the sealing member 119 is jammed, the frangible disc 127 fails allowing free communication of fluid through the valve 115. This provides improved valve safety.

The overpressure valve need not necessarily be located in the fuel tank system. According to yet another embodiment, the overpressure valve is located in the aircraft bleed-air inerting system. That bleed-air inerting system is arranged to cool and de-oxidise the bleed air and involves relatively large pressures. The frangible portion in the overpressure valve fails and allows communication of fluid through the valve in the event that the sealing member becomes jammed.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft comprising:
a wing;
a fuel tank system, at least a part of the fuel tank system being located in the wing; and
an overpressure valve associated with the fuel tank system, the overpressure valve comprising:
a shaft and a sealing member attached to one end of the shaft, the sealing member being moveable between a closed position for preventing free communication of fluid through the overpressure valve and an open position for allowing free communication of fluid through the overpressure valve, the sealing member being configured to move when a pressure differential across the valve is greater than a first pressure differential in a positive direction and when the pressure differential across the valve is greater than a second pressure differential in a negative direction; and
a web of frangible material extending radially outward of the shaft across at least part of the sealing member, the web of frangible material being arranged to fail when the pressure differential reaches a first increased pressure differential in the positive direction greater than the first pressure differential and when the pressure differential reaches a second increased pressure differential in the negative direction greater than the second pressure differential, and the web of frangible material being positioned for allowing free communication of fluid through the overpressure valve when the web of frangible material fails.

2. The aircraft according to claim 1 wherein the frangible portion is located above the lowest portion of the sealing member.

3. The aircraft according to claim 1 wherein the sealing member is arranged to move from the closed position toward the open position at the first pressure differential of +8 psi or more in magnitude, "+" referring to the positive direction.

4. The aircraft according to claim 1 wherein the sealing member is arranged to move from the closed position toward the open position at the second pressure differential of −5 psi or more in magnitude, "−" referring to the negative direction.

5. The aircraft according to claim 1 wherein the first increased pressure differential is 1psi more than the first pressure differential in magnitude, and the second increased pressure differential is 1psi more than the second pressure differential in magnitude.

6. The aircraft according to claim 1, wherein the fuel tank system comprises a surge tank and the overpressure valve is located in the surge tank.

7. The aircraft according to claim 1, wherein the fuel tank system comprises a plurality of fuel tanks, each fuel tank being defined by side-walls, and the overpressure valve is located in a side-wall of one of the fuel tanks.

8. The aircraft according to claim 1, wherein the fuel tank system comprises piping connecting parts of the fuel tank system and the overpressure valve is located in the piping.

9. The aircraft according to claim 1, further comprising a fluid container, wherein the overpressure valve is installed in a wall of the fluid container.

10. The aircraft according to claim 1, the overpressure valve further comprising:
a valve body to which the sealing member is slidably mounted; and
an actuating unit positioned at the top of the valve body and configured to move the sealing member between a close position and an open position.

11. An aircraft comprising:
a wing;
a fuel tank system, at least a part of the fuel tank system being located in the wing; and
an overpressure valve associated with the fuel tank system, the overpressure valve comprising:
a sealing member which is moveable between a closed position for preventing free communication of fluid through the overpressure valve and an open position for allowing free communication of fluid through the overpressure valve, the sealing member being configured to move when a pressure differential across the valve is greater than a first pressure differential in a positive direction and when the pressure differential across the valve is greater than a second pressure differential in a negative direction; and
a frangible portion being arranged to fail when the pressure differential reaches a first increased pressure differential in the positive direction greater than the first pressure differential and when the pressure differential reaches a second increased pressure differential in the negative direction greater than the second pressure differential, and the frangible portion being positioned for allowing free communication of fluid through the overpressure valve when the frangible portion fails, wherein the frangible portion is arranged to withstand a greater magnitude of positive pressure differential than negative pressure differential.

12. An aircraft wing of an aircraft, the aircraft wing comprising:
at least a part of a fuel tank system of the aircraft and an overpressure valve located in said part of the fuel tank system, the overpressure valve comprising:
a shaft and a sealing member attached to one end of the shaft, the sealing member being moveable between a closed position for preventing free communication of fluid through the overpressure valve and an open position for allowing free communication of fluid through the overpressure valve, the sealing member being configured to move when a pressure differential across the valve is greater than a first pressure differential in a positive direction and when the pressure differential across the valve is greater than a second pressure differential in a negative direction; and a web of frangible material extending radially outward of the shaft across at least part of the sealing member, the web of frangible material being arranged to fail when the pressure differential reaches a first increased pressure differential in the positive direction greater than the first pressure differential and when the pressure differential reaches a second increased pressure differential in the negative direction greater than the second pressure differential, and the web of frangible material being positioned for allowing free communication of fluid through the overpressure valve when the web of frangible material fails.

13. The aircraft wing according to claim 12, the overpressure valve further comprising:
   a valve body to which the sealing member is slidably mounted; and
   an actuating unit positioned at the top of the valve body and configured to move the sealing member between a close position and an open position.

14. An aircraft fuel tank system having an overpressure valve, the overpressure valve comprising:
   a shaft and a sealing member attached to one end of the shaft, the sealing member being moveable to open the overpressure valve in response to a first pressure differential which is a positive pressure differential acting from within the fluid container to an outside of said fluid container and having a first magnitude, and being movable to open the overpressure valve in response to a second pressure differential which is a negative pressure differential acting from the outside of the fluid container into said fluid container and having a second magnitude; and
   a web of frangible material extending radially outward of the shaft across at least part of the sealing member, the web of frangible material being configured to fail in response to a third pressure differential which is a positive pressure differential acting from within the fluid container to the outside of said fluid container and having a third magnitude greater than the first magnitude, and being configured to fail in response to a fourth pressure differential which is a negative pressure differential acting from the outside of the fluid container into the fluid container and having a fourth magnitude greater than the second magnitude, and the web of frangible material being positioned for allowing free communication of fluid through the overpressure valve when the web of frangible material fails.

15. The aircraft fuel tank system according to claim 14, wherein the first magnitude is greater than the second magnitude; and the third magnitude is greater than the fourth magnitude.

16. The aircraft fuel tank system according to claim 14, further comprising:
   a valve body to which the sealing member is slidably mounted; and
   an actuating unit positioned at the top of the valve body and configured to effect movement of the sealing member.

17. An overpressure valve being associated with a fluid container, the overpressure valve comprising:
   a sealing member being moveable to open the overpressure valve in response to a first pressure differential which is a positive pressure differential acting from within the fluid container to an outside of said fluid container and having a first magnitude, and being movable to open the overpressure valve in response to a second pressure differential which is a negative pressure differential acting from the outside of the fluid container into said fluid container and having a second magnitude; and
   a frangible portion being configured to fail in response to a third pressure differential which is a positive pressure differential acting from within the fluid container to the outside of said fluid container and having a third magnitude greater than the first magnitude, and being configured to fail in response to a fourth pressure differential which is a negative pressure differential acting from the outside of the fluid container into the fluid container and having a fourth magnitude greater than the third second magnitude, and the frangible portion being positioned for allowing free communication of fluid through the overpressure valve when the frangible portion fails,
   wherein the frangible portion comprises two semi-circular carbon fibre webs.

* * * * *